United States Patent [19]
Cousins et al.

[11] Patent Number: 5,975,788
[45] Date of Patent: Nov. 2, 1999

[54] LOCATING APPARATUS

[76] Inventors: Joseph Russell Cousins, RD 3, Box 284, Kittaning, Pa. 16201; Jeffrey John Baur, 22 Windmere Dr., Valencia, Pa. 16059

[21] Appl. No.: 09/119,011

[22] Filed: Jul. 20, 1998

[51] Int. Cl.⁶ .................................................. F16B 13/04
[52] U.S. Cl. ........................ 403/289; 403/290; 403/297; 403/408.1; 411/26; 411/32
[58] Field of Search ................... 403/297, 292, 403/289, 290, 321, 371, 408.1, 13, 374.4; 411/32, 33, 26; 269/95, 47, 100

[56] References Cited

U.S. PATENT DOCUMENTS

| | | | |
|---|---|---|---|
| 2,707,419 | 5/1955 | Schron | 269/47 |
| 4,248,411 | 2/1981 | Wagster et al. | 269/97 X |
| 4,500,079 | 2/1985 | Morghen | 269/47 |
| 4,712,811 | 12/1987 | Weir | 403/371 X |
| 4,921,381 | 5/1990 | Gschwend et al. | 41/32 X |
| 5,183,358 | 2/1993 | Foulkes, Jr. et al. | 411/32 X |
| 5,716,043 | 2/1998 | Iwata et al. | 269/100 X |
| 5,718,422 | 2/1998 | Morghen | 269/47 |
| 5,722,648 | 3/1998 | Groll et al. | 269/47 |

*Primary Examiner*—Lynne Reichard
*Assistant Examiner*—John R. Cottingham
*Attorney, Agent, or Firm*—Aileen Champion Addessi

[57] ABSTRACT

A locating apparatus includes a double expanding locating pin and a subplate having both threaded and precision holes, which are sized to accommodate the locating pin. The double expanding locating pin is a cylindrical housing having a first expandable end with a plurality of slots and a tapered portion and a second expandable end with a plurality of slots and a flange. A ball is disposed within the second expandable end and is forced by a set screw against the flange to spread apart wall portions of the cylindrical housing which are positioned intermediate the slots for expanding a lower portion of the locating pin. A cap having a flanged tapered end is threaded into the first expandable end of the cylindrical housing and is seated against the tapered portion of the cylindrical housing for forcing apart the wall portions positioned intermediate the slots for expanding an upper portion of the locating pin. The double expanding locating pin enables the pin to be expanded and secured within holes of two components, such as the subplate and a vise or the like.

20 Claims, 3 Drawing Sheets

LOCATING APPARATUS

BACKGROUND OF THE INVENTION

The invention relates to precisely positioning two components with respect to one another and, more particularly, to a locating apparatus which secures together the components.

During the machining of a workpiece, the workpiece is held within a vise or other holding device, which is secured to either an adapter plate or directly to a subplate. The base of the vise has holes which may be aligned with holes in the adapter plate or subplate. An alignment pin, which is formed of metal, is inserted through a hole in the vise or adapter plate and a hole in the subplate for accurately and precisely positioning the vise.

Currently, the alignment pin is either a standard dowel pin or a dowel pin having one expandable end. The expandable end is expanded after the dowel pin is positioned within the hole for securing the pin within the hole. The opposite end of the alignment pin may be tapped into a hole and must be precisely sized to provide a secure fit. Removal of the tapped in end of the alignment pin is often difficult.

A locating pin is disclosed in U.S. Pat. No. 4,500,079 entitled "Removable and Replaceable Locating Pin for Locating a Workpiece on a Sub-Plate for Machining". The locating pin includes a receiver bushing and a locator pin disposed therein. A plurality of balls are positioned in apertures in the locator pin and may be urged into locking engagement with the receiver bushing. However, only one end of the locating pin is expandable.

U.S. Pat. No. 2,707,419 discloses a fixture key which is slotted to facilitate spreading apart of the portions of the shank intermediate the slots. A ball is positioned within a bore of the shank and is held in position by a screw threadedly secured within the bore. However, the fixture key is only expandable at one end for securing the fixture key within a bore of a plate.

Therefore, what is needed is an apparatus for securing two components together which utilizes means for expanding both ends of a pin for securement of the pin to both components.

SUMMARY OF THE INVENTION

A locating pin for securing together two components includes a cylindrical housing having a first open end, a second open end and a bore therethrough with at least one threaded portion. The cylindrical housing has a plurality of first slots extending from the first open end toward the second open end and having a plurality of second slots extending from the second open end toward the first open end and positioned alternating with the first slots. The first open end has a tapered portion and the second open end has a flange extending radially inward.

An expanding device is positioned within the bore of the cylindrical housing and is contained by the flange of the second open end of the cylindrical housing. A threaded member has a threaded portion which corresponds to the threaded portion of the bore of the cylindrical housing for threading the threaded member into the bore, contacting the expanding device, and expanding the second open end of the cylindrical housing.

A cap has a tapered flange end with a bore at least partially therethrough and has a threaded portion corresponding to the threaded portion of the bore of the cylindrical housing. The tapered flange end corresponds to the tapered portion of the cylindrical housing for expanding the first open end of the cylindrical housing as the cap is threaded into the cylindrical housing.

The locating apparatus further includes a subplate having a plurality of holes at least partially therethrough. Each of the holes has a threaded portion, a non-threaded portion, and are precisely positioned for locating the holding device. The subplate is gold colored.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

Figure 1:
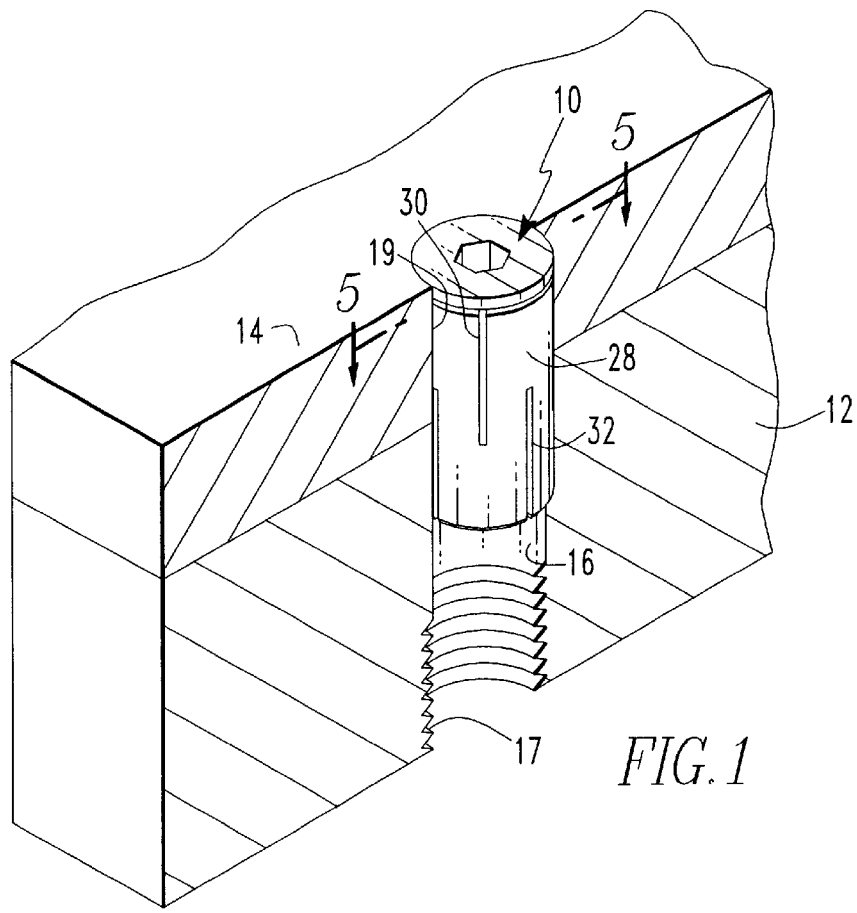
FIG. 1 is a partial cross-sectional view of a locating pin positioned within a subplate and a holding device.

Referring to FIG. 1, a locating apparatus for securing together two components includes a locating pin 10, which is formed of metal. As an example, the locating pin 10 may be disposed within a subplate 12 and a holding device 14, such as a vise or the like. Alternatively, the locating pin 10 may be disposed within an adapter plate, which is positioned between the subplate 12 and the holding device 14. In addition to the use of the locating pin 10 in the machining industry, the double expanding pin 10 may be used in the automotive industry, manufacturing, or any other area for accurately locating and/or securing fixtures or components together.

Figure 3:
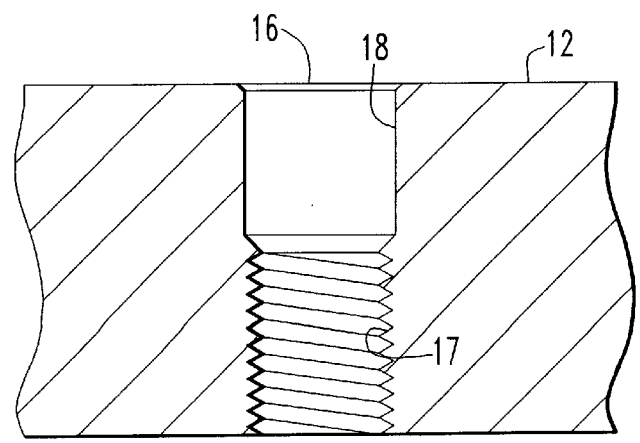
FIG. 3 is a view taken along line 3—3 of FIG. 2.
Figure 2:
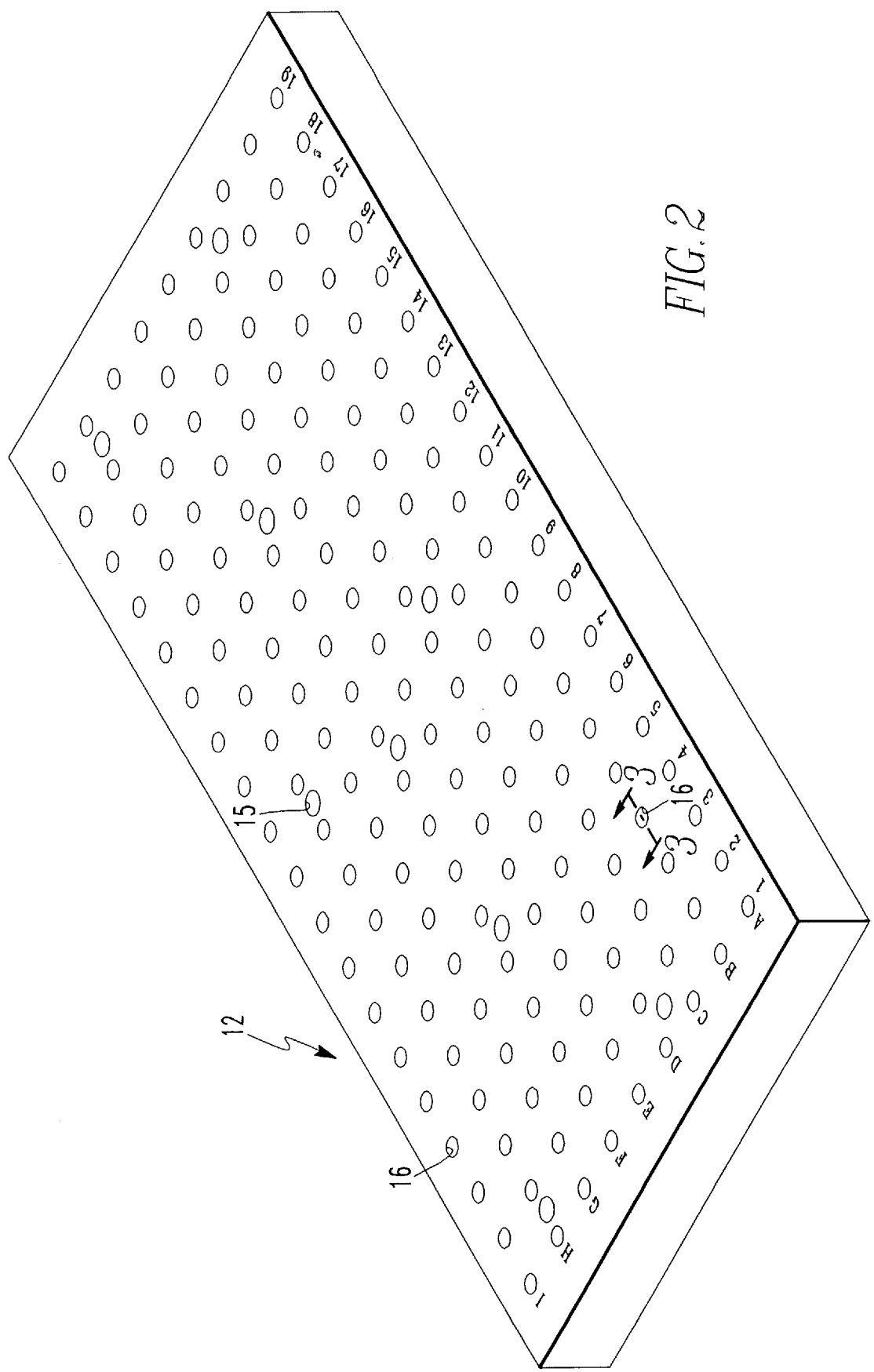
FIG. 2 is an isometric view of the subplate.
Figure 4:
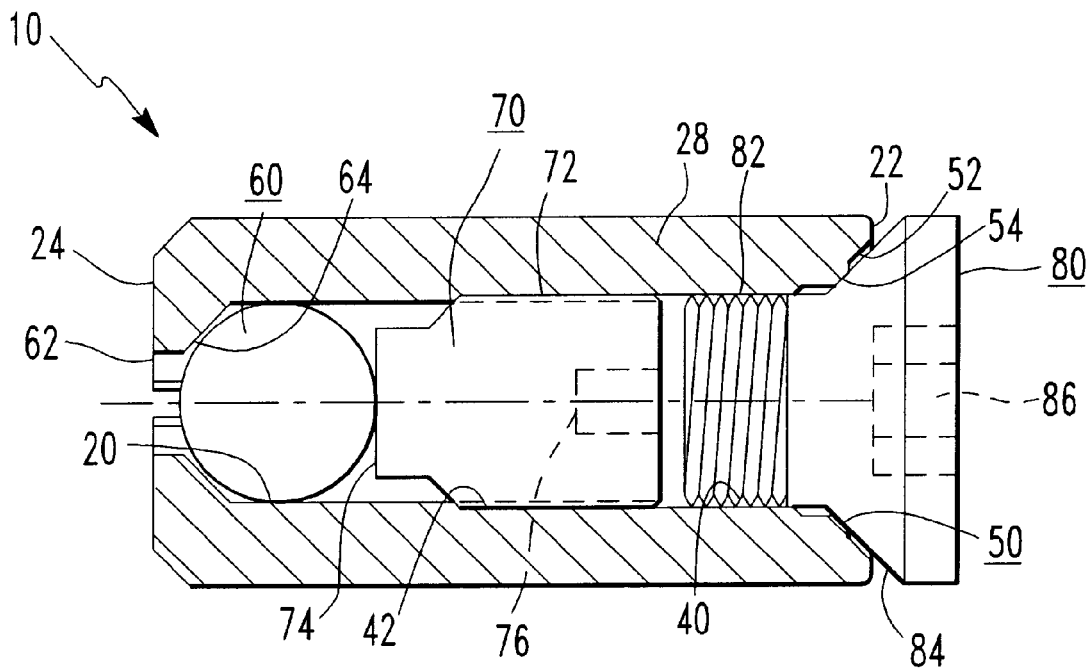
FIG. 4 is a cross-sectional view of the locating pin.
Figure 5:
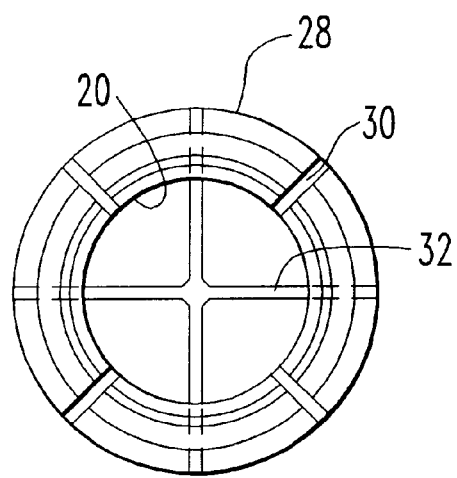
FIG. 5 is view taken along line 5—5 of FIG. 1.

Referring to FIGS. 1–3, the subplate 12 is used as a base or support member for positioning the vise or other holding device 14 in a precise and secure position with respect to a machining tool or the like. The subplate 12 has a plurality of mounting holes 15 for securing the subplate 12 to a work table or bed of a machine. The mounting holes 15 are variably spaced to accommodate various types of machines.

A precision hole is used to align and position the holding device 14 and is sized for insertion of the locating pin 10, and a threaded hole is used to secure the subplate 12 to a support surface of a machine and to secure fixtures to the subplate 12. The subplate 12 has a plurality of holes 16, each having a threaded portion 17, a bore or non-threaded portion 18, and being precisely positioned, enabling each hole 16 to be used as both a precision hole and a threaded hole. The subplate 12 is manufactured from aluminum and has a hard anodized surface with a gold colorization.

The vise or other holding device 14 has a plurality of holes 19 for use to secure the holding device 14 to another fixture. The holes 19 are sized for insertion of the locating pin 10.

Referring to FIGS. 1–5, the locating pin 10 is a cylindrical housing having a bore 20 therethrough forming a first open end 22 and a second open end 24. A wall 28 of the cylindrical housing surrounds the bore 20 and has a plurality of first slots 30 extending from the first open end 22 toward the second open end 24 and a plurality of second slots 32 extending from the second open end 24 toward the first open end 22. The slots 30 and 32 are positioned alternating with respect to one another and facilitate spreading apart of the wall portions positioned intermediate the slots 30 and 32 respectively. The first and second open ends 22 and 24 are first and second expandable ends for providing a double expanding locating pin 10.

The bore 20 of the pin has a first threaded portion 40 and a second threaded portion 42 having identical or different sized inside diameter threads. Alternatively, the first and second threaded portions 40 and 42 may be a single threaded portion.

The first open end 22 of the cylindrical housing has a tapered portion 50. The tapered portion 50 has a first taper 52 positioned adjacent the first open end 22 and a second taper 54 positioned between the first taper 52 and the bore 20. The second taper 54 has a smaller inside diameter as compared to the first taper 52.

An expansion mechanism is used to expand the wall 28 of the cylindrical housing. The expansion mechanism includes an expanding device, such as a ball 60 or the like, which is positioned within the bore 20 of the cylindrical housing and is contained by a flange 62 positioned at the second open end 24 of the cylindrical housing. The flange 62 has a tapered wall 64 which contacts the ball 60.

A threaded member, such as a set screw 70 or the like, has a threaded portion 72 with outside diameter threads which corresponds to the threaded portion 40 of the cylindrical housing for enabling the set screw 70 to be threaded into the bore 20 of the cylindrical housing. The set screw 70 has a protrusion 74 positioned at one end of the set screw 70 for contacting the ball 60 and a hexagonally shaped bore 76 positioned at an opposite end for enabling a wrench or other suitable tool to rotate the set screw 70 for pushing the protrusion 74 of the set screw 70 against the ball 60 for expanding the lower portion of the wall 28 of the locating pin 10.

A cap 80 has a threaded portion 82 with outside diameter threads which correspond to the threaded portion 42 of the cylindrical housing for enabling the cap 80 to be threaded into the bore 20 of the cylindrical housing. The cap 80 has a flanged tapered end 84 with a taper corresponding to the tapered portion 50 of cylindrical housing. The stepped taper of the tapered portion 50 of the cylindrical housing minimizes the contact area with the flanged tapered end 84 of the cap 80 for reducing the force required to turn the cap 80 and expand the wall 28 of the pin 10.

A hexagonally shaped bore 86 is positioned at an opposite end of the cap 80 as the threaded portion 82 for enabling a wrench or other suitable tool to rotate the cap 80 for pushing the tapered portion 82 against the tapered portion 42 of the cylindrical housing for expanding the upper portion of the wall 28 of the locating pin 10. Additionally, the cap 80 is sized to cover and enclose the bore 20 of the cylindrical housing for preventing metal chips produced during the machining process or other debris from entering into the bore 20 and contacting the threaded sections.

In operation, the ball 60 is disposed within the bore 20 of the cylindrical housing. The set screw 70 is threaded into the bore 20 of the cylindrical housing by inserting a wrench or other suitable tool into the hexagonal bore 76 of the set screw 70 and rotating the wrench or other tool. The locating pin 10 is positioned within the hole 16 of the subplate or other hole and the set screw 70 is rotated by the wrench until the protrusion 74 contacts the ball 60 and forces the ball 60 to push against the tapered wall 64 of the flange 62 of the cylindrical housing. As the ball 60 forces the wall portions 28 intermediate the slots 30 to spread apart, the lower portion of the wall 28 of the cylindrical housing expands.

After the locating pin 10 is secured within the hole 16, the cap 80 is threaded into the bore 20 of the cylindrical housing. The hole 19 in the vise or other holding device 14 is aligned with and slid onto an end of the locating pin 10 protruding from the hole 16. A wrench is inserted into the hexagonal bore 86 of the cap 80 and is rotated until the flanged tapered end 84 of the cap 80 contacts the tapered portion 50 of the cylindrical housing. As the cap 80 forces the wall portions 28 intermediate the slots 32 to spread apart, the upper portion of the wall 28 of the cylindrical housing expands. The double expanding locating pin 10 is secured within both holes 16 and 19.

An advantage of the locating apparatus is that the locating pin 10 is expandable at both ends for securing the locating pin 10 within two different components. Also, removal of the double expanding location pin 10 is quicker and easier as compared to previous pins, which required pounding to knock the precisely fit pin from the hole. To remove the double expanding locating pin 10 requires the removal of the cap 80 and rotation of the set screw 70 away from the ball 60, which contracts the wall 28 of the cylindrical housing back to its original diameter, enabling the pin 10 to be easily removed from each of the holes.

Another advantage is that the double expanding locating pin 10 allows looser machining tolerances. The holes of the two components and the diameter of the locating pin 10 do not have to be precisely sized with respect to one another due to the expanding feature of the locating pin 10.

The design of the cap 80 provides protection from metal chips or other debris from entering into the bore 20 of the cylindrical housing and damaging the threads of either the pin 10 or the set screw 70.

The locating pin 10 in combination with the subplate 12 having each hole 16 threaded and precisely positioned enables precise locating of workpieces. The double expanding locating pin 10 aids in the alignment of fixtures onto the subplate 12.

Thus there has been shown and described a novel locating apparatus which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

We claim:

1. A locating pin for securing or locating precisely together two components, comprising:

a cylindrical housing having a first open end, a second open end and a bore therethrough, said bore having at least one threaded portion, said cylindrical housing having a plurality of first slots extending from said first open end toward said second open end and having a plurality of second slots extending from said second open end toward said first open end and positioned alternating with said first slots, said first open end having a tapered portion and said second open end having a flange extending radially inward;

an expanding device positioned within said bore of said cylindrical housing and contained by said flange of said second open end of said cylindrical housing;

a threaded member having a threaded portion corresponding to said threaded portion of said bore of said cylindrical housing for threading said threaded member into said bore of said cylindrical housing, contacting said expanding device, and expanding said second open end of said cylindrical housing; and a cap having a tapered flange end with a bore at least partially therethrough, said cap having a threaded portion corresponding to said threaded portion of said bore of said cylindrical housing, said tapered flange end corresponding to said tapered portion of said cylindrical housing for expanding said first open end of said cylindrical housing as said cap is threaded into said cylindrical housing.

2. The locating pin according to claim 1, wherein said flange of said cylindrical housing has a tapered wall which contacts said expanding device contained within said bore of said cylindrical housing.

3. The locating pin according to claim 1, wherein said tapered flange end of said cap is sized to cover said bore of said cylindrical housing for preventing debris from entering said bore of said cylindrical housing.

4. The locating pin according to claim 1, wherein said tapered portion of said cylindrical housing includes a first taper positioned at said first open end and a second taper positioned between said first taper and said bore of said cylindrical housing, said second taper having a smaller inside diameter as compared to an inside diameter of said first taper.

5. The locating pin according to claim 1, wherein said threaded portion of said bore of said cylindrical housing includes a first threaded portion and a second threaded portion.

6. The locating pin according to claim 1, wherein:

said threaded member has a hexagonally shaped bore at least partially therethrough; and said bore of said tapered flange end of said cap is hexagonally shaped.

7. A locating apparatus, comprising:

a cylindrical housing having a first expandable end, a second expandable end, and a bore at least partially therethrough, said second expandable end having a flange extending radially inward;

an expansion mechanism disposed within said bore and positioned within one of said first and second expandable ends of said cylindrical housing for expanding one of said first and second expandable ends, said expansion mechanism contained by said flange of said second expandable end of said cylindrical housing; a threaded member having a threaded portion corresponding to a threaded portion of said bore of said cylindrical housing for threading said threaded said member into said bore of said cylindrical housing, contacting said expansion mechanism, and expanding said second expandable end of said cylindrical housing; and a cap disposed within the other of said first and second expandable ends of said cylindrical housing for expanding the other of said first and second expandable ends.

8. The locating apparatus according to claim 7, further comprising:

said cylindrical housing having a plurality of slots, said slots positioned alternating with wall portions of said cylindrical housing; and said cap having a threaded portion corresponding to said threaded portion of said bore of said cylindrical housing for enabling said cap to be threaded into said bore of said cylindrical housing and expanding said wall portions positioned intermediate with said slots of one of said first and second expandable ends.

9. The locating apparatus according to claim 7, wherein said cylindrical housing further comprises said flange extending radially inwardly and having a tapered wall which contacts said expansion mechanism contained within said bore of said cylindrical housing.

10. The locating apparatus according to claim 7, wherein said cap has a flanged end which is sized to cover said bore of said cylindrical housing for preventing debris from entering said bore of said cylindrical housing.

11. The locating apparatus according to claim 7, further comprising:

one of said first and second expandable ends of said cylindrical housing having a tapered portion; and said cap having a flanged tapered end corresponding to said tapered portion of said cylindrical housing for expanding one of said first and second expandable ends as said cap is disposed within said bore of said cylindrical housing.

12. The locating apparatus according to claim 11, wherein said tapered portion of said cap has a first taper and a second taper, said second taper having a smaller inside diameter as compared to said first taper for minimizing contact between said cap and said cylindrical housing.

13. The locating apparatus according to claim 7, further comprising:

said cylindrical housing having a plurality of slots, said slots positioned alternating with wall portions of said cylindrical housing;

wherein said expansion mechanism is a ball positioned within said bore of said cylindrical housing; and wherein said threaded member is a set screw disposed within said bore of said cylindrical housing for contacting said ball to expand said wall portions positioned intermediate with said slots of one of said first and second expandable ends of said cylindrical housing.

14. The locating apparatus according to claim 7, further comprising:

a subplate having a plurality of holes at least partially therethrough, each of said holes having a threaded portion, a non-threaded portion, and precisely positioned, said subplate having a gold colorization; and said cylindrical housing disposable within said plurality of holes of said subplate.

15. An apparatus for locating a holding device which has at least one hole, comprising:

a subplate having a plurality of holes at least partially therethrough, each of said holes having a threaded portion, a non-threaded portion, and precisely positioned for locating said holding device;

at least one pin disposed within said holes of said subplate and said holding device and contacting said non-threaded portion of said hole of said subplate, said pin having a first expandable end and a second expandable end; and a cap disposed within one of said first and second expandable ends of said pin for enabling said pin to be expanded and secured within one of said holes of said subplate and said holding device.

16. The apparatus according to claim 15, wherein said subplate is gold colored.

17. The apparatus according to claim 15, wherein said pin further comprises:
- a cylindrical housing having said first expandable end, said second expandable end, and a bore therethrough with at least one threaded portion, said cylindrical housing having a plurality of first slots extending from said first expandable end toward said second expandable end and having a plurality of second slots extending from said second expandable end toward said first expandable end and positioned alternating with said first slots, said first expandable end having a tapered portion and said second expandable end having a flange extending radially inward;
- an expanding device positioned within said bore of said cylindrical housing and contained by said flange of said second expandable end of said cylindrical housing;
- a threaded member having a bore at least partially therethrough and a threaded portion corresponding to said threaded portion of said bore of said cylindrical housing for threading said threaded member into said bore, contacting said expanding device, and expanding said second expandable end of said cylindrical housing; and
- said cap having a tapered flange end with a bore at least partially therethrough, said cap having a threaded portion corresponding to said threaded portion of said bore of said cylindrical housing, said tapered flange end corresponding to said tapered portion of said cylindrical housing for expanding said first expandable end of said cylindrical housing as said cap is threaded into said cylindrical housing.

18. The apparatus according to claim 17, wherein said flange of said cylindrical housing has a tapered wall which contacts said expanding device contained within said bore of said cylindrical housing.

19. The apparatus according to claim 17, wherein said tapered flange end of said cap is sized to cover said bore of said cylindrical housing for preventing debris from entering said bore of said cylindrical housing.

20. The apparatus according to claim 17, wherein said tapered portion of said cylindrical housing includes a first taper positioned at said first open end and a second taper positioned between said first taper and said bore of said cylindrical housing, said second taper having a smaller diameter as compared to a diameter of said first taper.

\* \* \* \* \*